Figure 1:
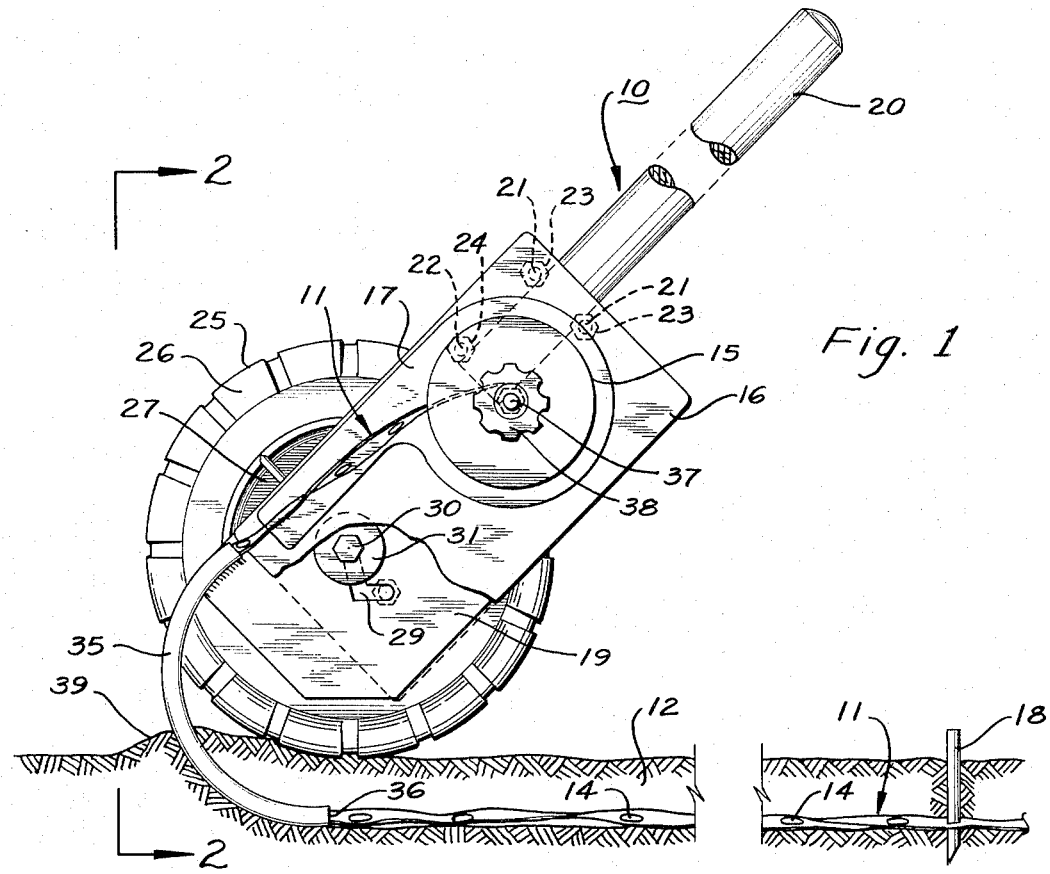

United States Patent [19]
Sanderson

[11] 3,817,042
[45] June 18, 1974

[54] SEED PLANTING IMPLEMENT

[76] Inventor: Martin I. Sanderson, 132 Grove St., Salinas, Calif. 93901

[22] Filed: June 23, 1972

[21] Appl. No.: 265,659

[52] U.S. Cl. ........................ 61/72.6, 37/193, 111/7
[51] Int. Cl. ........ F16l 1/00, A01b 13/02, E02f 5/02
[58] Field of Search ........ 61/72.6, 72.1, 72.5, 72.7, 61/72.2; 111/7, 86, 85; 37/193

[56] References Cited
UNITED STATES PATENTS

| | | | |
|---|---|---|---|
| 781,568 | 1/1905 | Stevens | 61/72.6 |
| 1,006,116 | 10/1911 | Morse | 61/72.6 X |
| 1,292,082 | 1/1919 | Sanford | 61/72.6 |
| 1,513,937 | 11/1924 | Seidler | 61/72.6 |
| 3,408,823 | 11/1968 | Okita et al. | 61/72.6 |

Primary Examiner—Jacob Shapiro
Attorney, Agent, or Firm—Joseph B. Gardner, Esq.

[57] ABSTRACT

An implement for planting a seed tape comprising a water soluable strip encapsulating seeds at spaced apart locations therealong and provided in rolled form upon a reel from which the strip can be unwound. The implement is operative to concurrently form a furrow in relatively soft or previously prepared soil, lay the seed strip within the furrow along the bottom thereof, and backfill the furrow to cover the strip as the device is moved continuously along the ground in which the strip is being planted. The device includes handle-equipped frame structure having a ground-engageable wheel rotatably supported thereon, plow structure carried by the frame and providing a plowshare operative to form the furrow, and guide structure which lays the strip within the furrow.

5 Claims, 2 Drawing Figures

SEED PLANTING IMPLEMENT

This invention relates to the art of planting or burying strip material within the ground and, more particularly, to a device or implement for burying an elongated strip in relatively soft soil to plant seeds or the like carried by the strip in spaced apart location therealong. A device embodying the invention is useful in burying a strip of any character as, for example, a strip containing plant nutrients, insecticides, etc., but it has particular utility in planting seed tapes.

Considering planting of seed tapes as an exemplary use for a device embodying the present invention, it may be observed that seed tapes are presently available through many commercial establishments, and they usually constitute an elongated strip of water soluable material having seeds secured thereto at spaced apart locations therealong. Usually, the seeds are encapsulated within the strip and are exposed for germination as soon as the strip is wetted at which time it dissolves. The elongated tape or strip is rolled into generally cylindrical convolutions upon a reel, thereby permitting the strip to be unwound from the reel for planting.

Prior to planting the strip, the soil is prepared in accordance with the practice of the person using the tape as, for example, by spading or otherwise loosening the soil, by mixing mulch and fertilizers and plant nutrients therein, etc. Furrows are then formed in the prepared soil, and the strip is laid along the bottom of the furrow and then covered with soil which is gently compacted. So far as is known, it has been generally necessary heretofore to form the furrow, plant the strip, and cover the furrow in separate operations and by hand which is not only a laborious operation but also time consuming, thereby increasing the costs for nurseries and other commercial establishments using seed tapes.

In view of the foregoing, an object of the present invention is to provide an improved device or implement for burying elongated strips in relatively soft or previously prepared soil quickly and easily and with a minimum of manual effort. Another object of the invention is the teh provision of an improved device of the character described which is susceptible of adaptation for use in home gardening, in commercial nurseries, and in open field or large commercial operations in which event the device may be mechanized by attaching the same to a farm vehicle.

Further objects, among others, of the present invention are that of providing an improved device of the type described that concurrently forms a furrow, places an elongated strip within such furrow, and backfills the furrow to cover the tape; that includes a frame structure having a ground-engageable wheel rotatably supported thereby and both a plow structure carried by the frame and providing a plowshare effective to form a furrow within relatively soft soil traversed by the wheel and guide structure for laying the strip within the furrow—the wheel, plow and guide structures being oriented and disposed so that a strip laid by the guide structure within a furrow formed by the plowshare is covered with soil traversed by the wheel; that has such plow and guide structures established as a mechanical integer; and that is effective to generally confine the soil raised by the plowshare to an area that lies generally within the sides of the wheel to enable the same to backfill the furrow and gently pack the soil upon the strip.

Additional objects and advantages of the invention, especially as concerns particular features and characteristics thereof, will become apparent as the specification continues.

Figure 2:
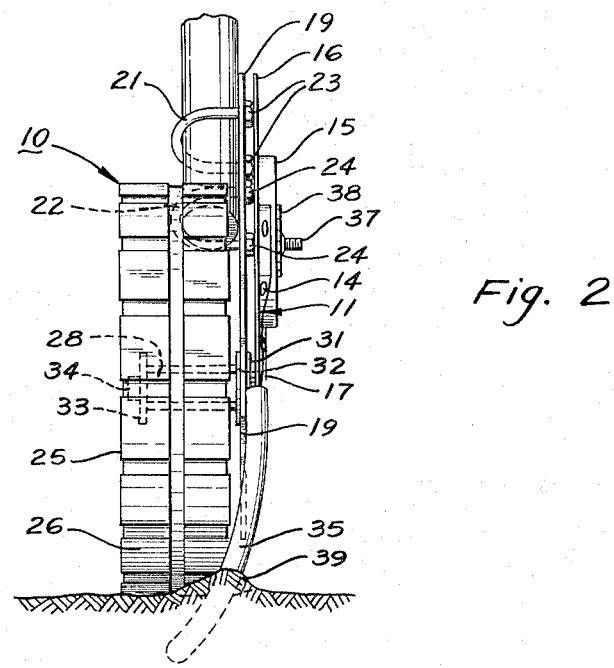

An embodiment of the invention is illustrated in the accompanying drawing, in which:

FIG. 1 is a broken side view in elevation of a seed planting implement embodying the present invention shown in use in planting a seed tape within soil prepared therefor; and FIG. 2 is a broken front view in elevation of the implement, the view being taken generally along the plane 2—2 of FIG. 1.

As previously explained, an implement or device embodying the present invention is adapted for use in burying or placing an elongated strip in relatively soft soil which, in the usual instance, will be soil previously prepared for the burying operation. Although the device may be used to bury or plant an elongated strip of any type, it will usually be used to plant a water soluable seed tape that carries in an encapsulated condition one or more seeds located at spaced apart positions therealong. The device is shown in FIGS. 1 and 2 during use in planting such a seed tape, and for purposes of identification, the device in its entirety is denoted with the numeral 10, the elongated seed tape is designated 11, and the furrow within which the strip 11 is buried is suggested by the numeral 12, although the furrow is actually covered for the most part as it is viewed in the drawing.

Seed tapes such as those depicted in the drawing do not per se form any part of the present invention and they are manufactured by a number of companies as, for example, Northrup, King & Co. of Minneapolis, Minnesota. Such tapes are usually composed of a water soluable organic material, and they encapsulate seeds 14 at spaced apart locations therealong. Upon being subjected to moisture, the tape dissolves, thereby exposing the seeds 14 to moisture so as to permit the same to germinate. The tape strip 11 is supplied in a roll or coil that is confined within a reel 15 that may be supported on a generally rectangular card 16 having planting instructions, advertising, etc., printed thereon. The strip 11 is intended to be unreeled or withdrawn from the reel 15 without removal thereof from the card 16 (although this is not necessary), and a guide 17 may be provided along the card 16 through which the strip is conveniently withdrawn. The guide 17 and confining member for the reel 15 may, for example, be provided by a transparent enclosure adhesively or otherwise secured to the card, thereby forming a blister-type package. As previously explained, seed packages and tape strips 11 of this type are old and well known in the art. Further, the device 10 need not have its use confined to the particular type of seed package described.

It may also be observed that in conventional use of the described seed package and strip 11, the strip is usually secured or fixed at one end by means of a stake 18 driven through the strip or otherwise secured thereto so as to establish a relatively firm support holding the tape so that it can be withdrawn from the reel 15 by the tensile force imparted by the stake as the strip is gently withdrawn from the reel. It will be observed in FIG. 1 that the fixed end of the strip 11 is located within the furrow 12 which, evidently, is a preferred arrangement although not essential. It will also be appreciated that the depth of the furrow 12 will depend upon the depth at which any particular seeds 14 should be planted, and the device 10 is adjustable so that changes in planting depth can be accommodated, as will be described subsequently. By way of example, seeds such as cucumber and onion seeds ordinarily have a preferred planting depth of approximately 1/4th of an inch.

The device or implement 10 includes frame structure 19. In the particular embodiment being considered, the frame structure 19 takes the form of a generally flat or planar plate of generally rectangular configuration that approximates the size of the card 16 although slightly longer than the card, as is best observed in FIG. 1. The plate-like frame structure 19 is equipped with a handle 20 to enable the device to be manipulated manually with convenience and facility. The handle 20 may be secured to the frame structure 19 in any usual and conventional manner, and in the form shown it is removably secured thereto by a pair of U-shaped clamps 21 and 22 which extend about the handle (see FIG. 2) and have threaded end portions that project through openings provided therefor in the frame structure 19. The clamps 21 and 22 are respectively drawn into tight clamping engagement with the handle 20 by means of nuts 23 and 24 that engage the threaded ends of the clamps. The device 10 further includes a ground-engageable wheel 25 rotatably supported by the frame 19. The wheel 25 may be of any suitable type, and in the configuration illustrated, it includes a hard rubber tire or rim 26 mounted upon a hub 27 equipped centrally with a sleeve bearing or bushing 28 (FIG. 2). As respects the present invention, the wheel 25 may be completely conventional and may take any convenient and usual form.

The interconnection of the wheel 25 with the frame structure 19 permits positional adjustment therebetween so as to enable the device 10 to form furrows 12 of different depth and to place a strip 11 at the bottom thereof, as considered further hereinafter. The adjustment means by which the relative positions of the frame structure 19 and wheel 25 can be changed includes the particular interconnection of the wheel and frame structure in the form of the device being considered. In this respect, the plate 19 is provided wtih a somewhat L-shaped slot 29 therein through which a bolt 30 extends which also extends through the bearing 28 defining the rotatable support for the wheel. Advantageously, a pair of relatively large washers 31 and 32 are respectively disposed along opposite sides of the frame structure 19 so as to enable the head of the bolt 30 to bear therethrough against one side of the plate structure and to enable the sleeve bearing 28 to press therethrough against the opposite side of the plate structure. Similarly, a relatively large washer 33 abuts the opposite end of the sleeve bearing 28, and a nut 34 engages the threaded outer end of the bolt 30 and bears against the washer 33. Whenever the nut 34 is loosened, the bolt 30 can be moved along the slot 29 into any desired position (it is generally positioned at one or the other of the extremities of the slot or at the mergence of the two legs thereof), and upon tightening the nut 34, the wheel 25 is fixedly located at any position of adjustment.

Also forming a part of the device 10 is plow structure carried by the frame 19 and providing a plowshare generally aligned with the wheel 25 and operative upon manipulation of the device to form the furrow 12 in the ground or soil traversed by the wheel, as is illustrated in both FIGS. 1 and 2. The plow structure and plowshare thereof in the particular device 10 being considered constitute certain portions and surfaces of a tube 35 secured, as by means of welding, adjacent one end thereof to the frame structure 19 and projecting adjacent its opposite end to a location beneath the wheel 25. The tube 35 actually defines a compound curvature in which it curves downwardly and rearwardly from the frame structure 19, as seen in FIG. 1, and also curves inwardly from the outer surface of the frame 19 so as to underlie the wheel 25 and terminate essentially at the midpoint thereof. For purposes of more specific identification, all of the forwardly and downwardly facing surface portions of the tube 35 may be taken to be the plow structure, and that portion of the plow structure that actually engages the body of soil and forms the furrow 12 therein may be taken to be the plowshare. Generally, then, the plowshare is defined along the lower half of the tube 35, and it enters the soil to form the furrow forwardly of the ground-engaging point of contact of the wheel 25. The device 10 also includes as a component thereof guide structure for laying the strip 11 within the furrow 12 as the wheel 25 traverses the body of soil. The guide structure is also defined by the tube 35 and may be taken to be the passage or central opening through the tube. In this reference, the tube is open at each end thereof, and the lower open end 36 establishes the outlet or discharge opening through which the strip 11 emerges as it is unwound from the reel 15 and laid along the bottom of the furrow 12. Accordingly, the plow and guide structures are essentially integral or a mechanical integer, in the form of device 10 being considered, and constitute the multiple-curvature tube 35.

It will be observed in FIG. 2 that the plow structure and especially the plowshare thereof is narrower than the wheel 25 and is essentially confined within planes defined by the sides of the wheel. As a result, substantially all of the soil raised by formation of the furrow 12 lies within the transverse dimensions of the wheel 25 so as to be traversed thereby. This orientation and arrangement of the various components is exceedingly desirable in that it results in the furrow formed by the plowshare being covered or backfilled with soil immediately after its formation because of the rolling action of the wheel thereover.

Mounting means for the rolled strip 11 are also provided by the device 10, and in the form shown, such means provides or defines a support for the reel 15 and card 16 carrying the same. The means are in the form of an elongated threaded end portion 37 of the aforementioned clamp 22, and such end portion is sufficiently long that it extends through the card 16 and reel 15, as shown best in FIG. 2. Threadedly received upon the elongated end portion 37 of the clamp is a relatively flat nut 38 that may have a knurled or otherwise configurated circumferential edge portion to facilitate manual rotation of the nut. It will be apparent that the nut 38 is removed to permit a used card and depleated reel to be taken from the spindle-defining end portion 37 and plate 19 upon which it is mounted, and a full reel-equipped card positioned upon the spindle and held in place thereon by tightening the nut 38 thereagainst.

In use of the device 10, a card 16 with a strip roll thereon is mounted upon the spindle 37, in the manner previously explained, the lower end portion of the guide 17 is pealed back to expose the free end of the strip 11 which is then withdrawn from the reel 15 in sufficient length to feed the same through the passage of the tube 35 and then permit the free end portion of the strip to be anchored in fixed position by the stake 18, as shown in FIG. 1. In this respect, it may be desirable to form a short section of the furrow 12 by hand so as to permit the staked end portion of the strip to be disposed along the bottom of the furrow. As previously stated, the soil will either be quite soft in its natural state or, more usually, previously prepared by being spaded, mixed with mulch, or otherwise conditioned in accordance with conventional practice.

The lower end portion of the tube 35 is then either seated within the previously open section of the furrow 12 or is simply pressed into the soil until the wheel 25 rests thereupon. The handle 20 is then grasped and the device 10 rolled along the ground at any pace convenient to the user. Such forward motion thereby imparted to the device 10 will cause the plow and plowshare portions of the tube 35 to form the furrow 12 slightly in advance of the point of contact of the wheel 25 with the ground and, at the same time, the strip 11 will be unrolled from the reel 15 and placed along the bottom of the furrow. Also at the same time, the wheel 25 will roll over the elevated portions of the soil raised by the plowshare as it forms the furrow 12, thereby backfilling the furrow to cover the strip 11 and gently pack the soil downwardly thereupon. Depending upon the length of the strip 11 and size of the plot or the length intended for the row of seeds being planted, the device continues to be rolled along the ground until the entire strip 11 is unreeled, whereupon the device is ready to have the exhausted card 16 removed and replaced with a full card. On the other hand, if the row is shorter than the length of the strip 11, the strip is simply broken or cut at the point at which a sufficient length has been planted, and a second or subsequent row is started in the same manner as previously explained.

It may be noted that very little soil is raised by the plowshare as it is advanced through the body of soil, and that quantity of soil that is raised tends to be confined generally to an area immediately forwardly of the tube 35 and to the side thereof underlying the wheel 25. This result is due at least in part to the compound curvature of the tube 35, and it enables the wheel to function successfully in backfilling the furrow 12 and compacting the soil gently upon the strip 11. For purposes of identification, the elevated portion of the soil plowed by the plowshare is denoted generally with the numeral 39.

It will be evident that a seed-planting operation can be effected by means of the device 10 quickly and effortlessly, yet properly and accurately. It can be used for planting seeds of any type including food products such as vegetables, decorative plants such as flowers, etc. Also, the device is susceptible for use for home gardening, for nursery plantings, and for open field or commercial plantings. In the latter cases, the device might be mounted upon or otherwise carried by a motorized vehicle, and it would be made sufficiently large to hold large rolls of tape. By way of comparison, in a commercial operation 5,000 to 6,000 feet of tape might be required to place of the order of 26,000 lettuce plants to an acre of ground, whereas for home or nursery gardening a strip of tape 14 feet long might be used which would contain of the general order of 200 seeds.

While in the foregoing specification an embodiment of the invention has been set forth in considerable detail for purposes of making a complete disclosure thereof. It will be apparent to those skilled in the art that numerous changes may be made in such details without departing from the spirit and principles of the invention.

What is claimed is:

1. A device for burying an elongated strip in relatively soft soil to plant seeds or the like carried by the strip, comprising: frame structure; a ground-engageable wheel rotatably supported by said frame; plow structure carried by said frame and providing a plowshare generally aligned with said wheel to form a furrow in such soil as it is traversed by the wheel; and guide structure for laying such strip within such furrow as said wheel traverses the soil; said wheel, plow and guide structure being oriented and disposed so that a strip laid by said guide structure within a furrow formed by said plowshare is covered with soil traversed by said wheel; said plow structure, plowshare thereof, and guide structure comprising a mechanical integer; said mechanical integer comprising a tube secured to said frame structure and extending downwardly and curving rearwardly into underlying relation with said wheel, the surface portions of said tube that extend generally downwardly defining said plow structure and plowshare thereof, and said tube having an outlet opening adjacent the lower rearward extremity of the plowshare and such opening together with the passage through said tube defining the aforesaid guide structure.

2. A device for burying an elongated strip in relatively soft soil to plant seeds or the like carried by the strip, comprising: frame structure; a ground-engageable wheel rotatably supported by said frame; plow structure carried by said frame and providing a plowshare generally aligned with said wheel to form a furrow in such soil as it is traversed by the wheel; and guide structure for laying such strip within such furrow as said wheel traverses the soil; said wheel, plow and guide structures being oriented and disposed so that a strip laid by said guide structure within a furrow formed by said plowshare is covered with soil traversed by said wheel; said plow structure, plowshare thereof, and guide structure comprising a mechanical integer; said mechanical integer comprising a curved tube secured to said frame structure and extending downwardly and forwardly toward the front of said wheel and then curving downwardly and rearwardly into underlying relation therewith, the surface portions of said tube that extend generally forwardly and downwardly defining said plow structure and plowshare thereof, and said tube having an outlet opening adjacent the lower rearward extremity of the plowshare and such opening together with the passage through said tube defining the aforesaid guide structure.

3. The device of claim 2 in which said plowshare is narrower than said wheel and is generally confined within planes defined by the sides of said wheel so as to form a furrow covered with soil traversed by the wheel as aforesaid.

4. The device of claim 3 in which such strip is a water soluable seed tape encapsulating seeds at spaced apart locations therealong and provided as a rotatable coil from which the strip may be unreeled, and further comprising mounting means providing a support for such strip roll to enable the same to be unreeled and further comprising adjustment means for selectively changing the positional relationship of said wheel and frame to enable the depth of the furrow formed by said plowshare to be changed in accordance with the requirements of any particular strip.

5. The device of claim 4 in which said frame structure includes a handle-equipped plate element, said wheel being rotatably supported by said plate element along one side thereof, and said mounting means and tube being carried by said plate element along the opposite side thereof.

* * * * *